United States Patent
Martyanov (10) Patent No.: US 11,442,804 B2
(45) Date of Patent: Sep. 13, 2022

(54) ANOMALY DETECTION IN DATA OBJECT TEXT USING NATURAL LANGUAGE PROCESSING (NLP)

(71) Applicant: PAYPAL, INC., San Jose, CA (US)

(72) Inventor: Dmitry Martyanov, Cupertino, CA (US)

(73) Assignee: PAYPAL, INC., San Jose, CA (US)

( * ) Notice: Subject to any disclaimer, the term of this patent is extended or adjusted under 35 U.S.C. 154(b) by 438 days.

(21) Appl. No.: 16/728,102

(22) Filed: Dec. 27, 2019

(65) Prior Publication Data

US 2021/0200612 A1  Jul. 1, 2021

(51) Int. Cl.
| | | |
|---|---|---|
| *G06N 3/02* | (2006.01) | |
| *G06F 11/07* | (2006.01) | |
| *G06F 11/34* | (2006.01) | |
| *G06K 9/62* | (2022.01) | |
| *G06N 3/08* | (2006.01) | |
| *G06F 40/20* | (2020.01) | |
| *G06F 40/279* | (2020.01) | |

(52) U.S. Cl.
CPC ........ *G06F 11/079* (2013.01); *G06F 11/3476* (2013.01); *G06F 40/20* (2020.01); *G06F 40/279* (2020.01); *G06K 9/6267* (2013.01); *G06N 3/088* (2013.01)

(58) Field of Classification Search
CPC .... G06F 11/079; G06F 11/3476; G06F 40/20; G06F 40/279; G06F 11/3006; G06K 9/6267; G06K 9/6271; G06N 3/088; G06N 3/0454; G06V 10/768; G06V 10/82
USPC .......................................................... 706/15
See application file for complete search history.

(56) References Cited

U.S. PATENT DOCUMENTS

| | | | | |
|---|---|---|---|---|
| 2019/0391891 A1* | 12/2019 | Gupta | ................. | G06F 11/2263 |
| 2020/0285737 A1* | 9/2020 | Kraus | .................... | G06F 21/554 |
| 2021/0011920 A1* | 1/2021 | Sudarsan | ............. | G06N 3/0454 |

\* cited by examiner

*Primary Examiner* — Charlotte M Baker
(74) *Attorney, Agent, or Firm* — Haynes and Boone, LLP (57) ABSTRACT

Systems and methods are disclosed for detecting anomalies in text content of data objects even when a format of the data and/or data object is unknown. These may include receiving a first data object that corresponds to a first application service and that includes first text content. An anomaly classifier may be trained based on an artificial neural network by using a natural language processing algorithm on respective text content of at least a portion of each of a plurality of data objects corresponding to the first computing service. Each of the plurality of data objects may be labeled as belonging a category. The trained anomaly classifier may identify one or more text character sequences in the first text content of the first data object as anomalous and output identifying information indicating the one or more anomalous text character sequences in the first text content of the first data object.

20 Claims, 8 Drawing Sheets

ANOMALY DETECTION IN DATA OBJECT TEXT USING NATURAL LANGUAGE PROCESSING (NLP)

FIELD OF INVENTION

The present specification generally relates to process automation based on machine learning, and more specifically, to detecting anomalies in text content of data objects using neural networks where a complete structural format of the text content is unknown according to various embodiments of the disclosure.

BACKGROUND

Data objects that include textual content are often generated by services and applications in computer systems and computer networks for various reasons. For example, in a shared infrastructure network architecture, various services may communicate with each other across a central service. The communications between the services may result in the generation of data objects such as log files that include text content. The text content may be partially or fully structured such as having a plurality of fields having a corresponding value to the fields. When there is an error in the communications or a condition (e.g., desirable or undesirable condition) in the network that stems from the communications in the network, an administrator may look to the log files of those communications associated with the condition to help troubleshoot what is causing that condition. However, the log files may include hundreds to thousands to millions of characters of text. Manually analyzing the text of log files that are associated with the condition to the text of log files that are not associated with the condition to determine any anomalies in the text of the log files is time consuming and often inaccurate. Further, in an environment with multiple services, a person analyzing a text log for evidence of an error related to a particular service may not have familiarity with that particular service. This may compound the difficulty in trying to isolate the cause of an error condition (if you do not know what you are looking for, how do you know it's the cause of an error?) Thus, Applicant recognizes that a problem exists with regard to processing text to determine if an anomaly (e.g. an error condition) exists.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for using machine learning with a classifier (e.g. based on an artificial neural network) to detect anomalous text sequences in text content of a data object without the classifier knowing the complete structure of the text content in the data object during training, according to various embodiments. These methods may be particularly advantageous in detecting possible error conditions in underlying data even when the correct format of the underlying data is unknown (or is not fully known). As a brief simplified example, consider a data object that includes a field labeled "Contact_Address." It may not be clear that this field requires an email address, rather than a phone number, for an application relying on that data object to function correctly.

However, if the training data shows that this "Contact_Address" field generally contains one to thirty alphabetic characters, followed by the "@" symbol, followed by a few more alphabetic characters, then the "." (dot) symbol followed by a three letter sequence (e.g., .com, .net, .org), then the classifier can effectively learn the unstated rules of what an email address should look like, even if the classifier is not explicitly aware this data should be an email address or what rules must be satisfied for an email address to be in the correct format. Then, if a new data object generates an error condition because a phone number is listed instead of an email address, the classifier can identify the phone number as an anomaly. This anomaly identification by the classifier will be enabled because a United States phone number, for example, will be a sequence of ten numerical digits, and will not contain an "@" symbol or "." symbol or instead contain a sequence of numbers and symbols that the classifier identifies as a United States phone number.

Accordingly, applications within a networked system may generate data objects that include text content in response to various actions. For example and as discussed above, log files of messages communicated between applications in a shared infrastructure network architecture may be generated that include tens to thousands of characters of text. The text content may have some kind of internal structure but it may be difficult for an administrator to determine what is causing a condition (e.g., an error, a desirable condition, an undesirable condition) in the networked system by examining a particular log file associated with that condition and comparing it to log files associated with instances where the condition did not exist. This may be particularly true in the case of a centralized communication service that facilitates communication between numerous other applications. The communication service—and its users and administrators—may not be aware of all the rules and requirements of their application clients. If an error occurs, it might not be clear whether this error was due to a problem in the application, or perhaps due to some fault of the communication service. The present techniques thus allow for anomaly detection even when the format of the underlying data is not fully known. These techniques, of course, may be applied in a number of technological environments and are not limited to instances where a centralized communication service is present.

According to various embodiments of the disclosure, an anomaly detection system may adopt a machine learning approach to improve accuracy in detecting anomalous text character sequences that may include one or more characters, one or more words and/or one or more phrases that may be the cause of the condition or direct an administrator to the cause of the condition on the networked system. Note that as used herein, the term "text character" may refer to any data that fits into one or more character sets—and thus, without limitation, a text character may include an alphabetical character, a non-English character or symbol (e.g. pictograph), a numeric digit, a punctuation symbol, or other symbol (e.g. "*", "%", "^", etc.).

In some embodiments, the anomaly detection system may train an anomaly classifier using an artificial neural network and a natural language processing algorithm that identifies characters, words and/or phrases that can be embedded into vector space as inputs for the artificial neural network. The artificial neural network may include an unsupervised neural network that can extract features from the vectors and is used to learn possible values and structure of the data object. The unsupervised neural network can also provide weights to a supervised neural network that is trained using labels associated with data objects and the text content of the data objects. The trained supervised neural network may compare the features generated from the unsupervised neural network to determine anomalies in character sequences. As such, a trained anomaly classifier is generated that can process a data object without its structure being completely known to the trained anomaly classifier prior to the data object being inputted into the trained anomaly classifier. When a data object is received by the anomaly detection system, an anomaly detection engine may access the trained anomaly classifier and use the trained anomaly classifier to output identifying information indicating one or more anomalous text character sequences in the text content of the data object. The identifying information may be used by an administrator to determine what is causing the condition in the system. (Note that as used herein the phrase "text character sequence" may refer to one or more sequential characters).

Figure 1:
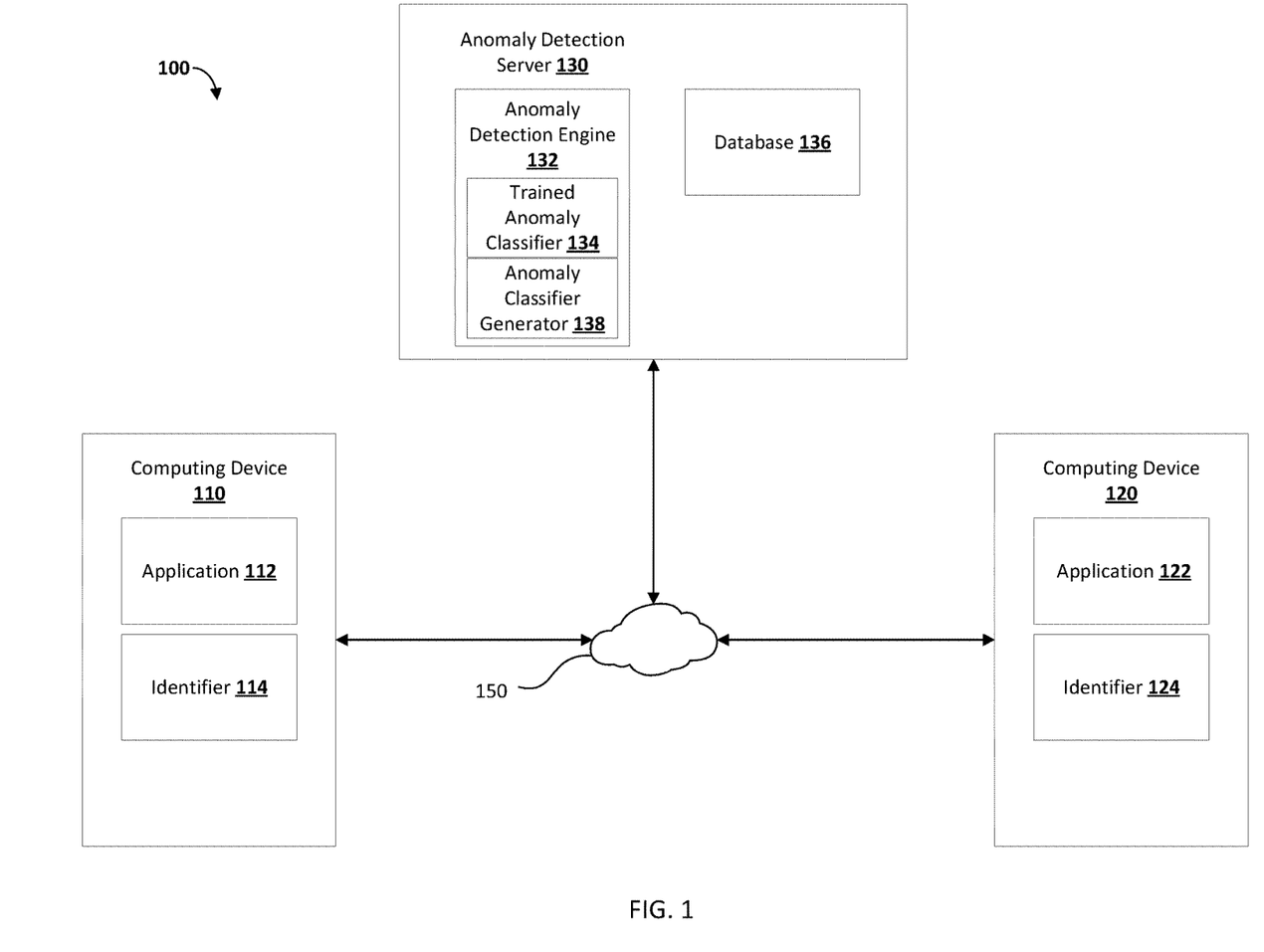
FIG. 1 is a block diagram illustrating a networked system according to an embodiment of the present disclosure.

FIG. 1 illustrates a networked system 100 according to one embodiment of the disclosure. The networked system 100 includes a computing device 110, a computing device 120, and an anomaly detection server 130, that may be communicatively coupled with each other via a network 150. The network 150, in one embodiment, may be implemented as a single network or a combination of multiple networks. For example, in various embodiments, the network 150 may include the Internet and/or one or more intranets, landline networks, wireless networks, and/or other appropriate types of communication networks. In another example, the network 150 may comprise a wireless telecommunications network (e.g., cellular phone network) adapted to communicate with other communication networks, such as the Internet.

The computing device 110 may include, for example, an external network resource that may be utilized by a user to interact with the computing device 120 that may include an internal network resource over the network 150. For example, the user may use the computing device 110 to conduct an online purchase transaction with the computing device 120 via a website hosted by the computing device 120, a mobile application associated with the computing device 120, or a point-of-sale (POS) system associated with the computing device 120. The computing device 110, in various embodiments, may be implemented using any appropriate combination of hardware and/or software configured for wired and/or wireless communication over the network 150. In various implementations, the computing device 110 may include at least one of a wireless cellular phone, wearable computing device, PC, laptop, etc.

The computing device 110, in one embodiment, includes an application 112 such as, for example, an external application (e.g., a client application such as, for example, a web browser, a mobile payment application, etc.), which may be utilized by the user to conduct electronic transactions (e.g., online payment transactions, etc.) with the computing device 120 over the network 150 or any other client/server interaction that would be apparent to one of skill in the art in possession of the present disclosure. The computing device 110 may also include at least one computing device identifier 114, which may be implemented, for example, as an IP address, operating system registry entries, cookies associated with the application 112, identifiers associated with hardware of the computing device 110 (e.g., a media control access (MAC) address), network domain information, and/or various other appropriate identifiers.

Even though only one computing device 110 is shown in FIG. 1, it is contemplated that one or more external network resources (each similar to the computing device 110) may be communicatively coupled with a computing device 120 and/or the anomaly detection server 130 via the network 150 within the networked system 100.

The computing device 120, in various embodiments, may be maintained by an operating entity (or in some cases, by a partner of an operating entity that processes transactions on behalf of the operating entity). Examples of operating entities include but are not limited to merchant sites, resource information sites, utility sites, real estate management sites, social networking sites, etc., which offer various services accessible over the network 150.

Even though only one computing device 120 is shown in FIG. 1, it has been contemplated that one or more internal network resources (each similar to the computing device 120) may be accessible to one or more external network resources that are provided by the computing device 110 and/or the anomaly detection server 130 via the network 150 within the networked system 100.

The computing device 120, in one embodiment, may include an application 122, which may be configured to provide information over the network 150 to the application 112 of the computing device 110. For example, the user of the computing device 110 may interact with the application 122 through the application 112 over the network 150 to request information, conduct a commercial transaction, or otherwise interact with the application 122. The computing device 120, in one embodiment, may include at least one computing device identifier 124, which may identify the computing device 120 and/or the application 122 being accessed by the application 112. In one implementation, the computing device identifier 124 may include a server identifier (e.g. hostname, IP address), application identifier (e.g., URL, application name), and/or other identifier that identifies a computing device 120 that would be apparent to one of skill in the art in possession of the present disclosure. The computing device identifier 124 may include attributes related to the computing device 120, such as identification information (e.g., a serial number, a location address, GPS coordinates, a network identification number, etc.).

The anomaly detection server 130, in one embodiment, may be maintained by a transaction processing entity, an online service provider, or another operating entity, which may provide network monitoring services for interactions of the computing device 110 and the computing device 120. As such, the anomaly detection server 130 may include an anomaly detection engine 132 which may be adapted to interact with the computing device 110 and/or the computing device 120 over the network 150 to facilitate the anomaly detection services offered by the anomaly detection server 130. In one example, the anomaly detection server 130 may be provided by PayPal®, Inc., of San Jose, Calif., USA, and/or one or more service entities or a respective intermediary that may provide multiple point of sale devices at various locations to facilitate transaction routings between users such as merchants and, for example, service entities.

The anomaly detection engine 132 may also include a trained anomaly classifier 134 that is configured to process data objects generated by the computing devices 110 and 120 from the anomaly detection engine 132 to identify one or more text character sequences in text content in the data objects as anomalous. For example, the anomaly detection engine 132 may process data objects gathered from the computing device 110 and/or the computing device 120 to determine when those data objects are associated with a condition in the networked system that needs investigating. In another example, the trained anomaly classifier 134 may interface with the anomaly detection engine 132 to process the data objects that are labeled with their condition to detect anomalous network traffic. The anomaly detection engine 132 may include an anomaly classifier generator 138 that is used to train the trained anomaly classifier 134, as discussed in further detail below. The anomaly detection engine 132, the trained anomaly classifier 134, and the anomaly classifier generator 138 may be implemented as executable computer instructions stored on a computer-readable medium.

The anomaly detection server 130, in one embodiment, may be configured to access and/or maintain data needed by the anomaly detection engine 132, the trained anomaly classifier 134, and the anomaly classifier generator 138 in a database 136. For example, the database 136 may include historical data objects and store outputs from the anomaly detection engine 132 and the trained anomaly classifier 134. The database 136 may also store various trained anomaly classifiers 134 that may be generated by the anomaly classifier generator 138 according to the condition that is associated with the trained anomaly classifier. In certain embodiments, the database 136 may also be used to store information for identifying the type of anomalous data objects. The database 136 may also include multiple databases, in various embodiments.

While the computing device 110 is described as an external network resource having an external application, one of skill in the art in possession of the present disclosure will recognize that the computing device 110 and the computing device 120 may be internal network resources that are communicating over the network 150. As such, the computing device 110 and the computing device 120 may host services that communicate with each other within the networked system 100.

Figure 2:
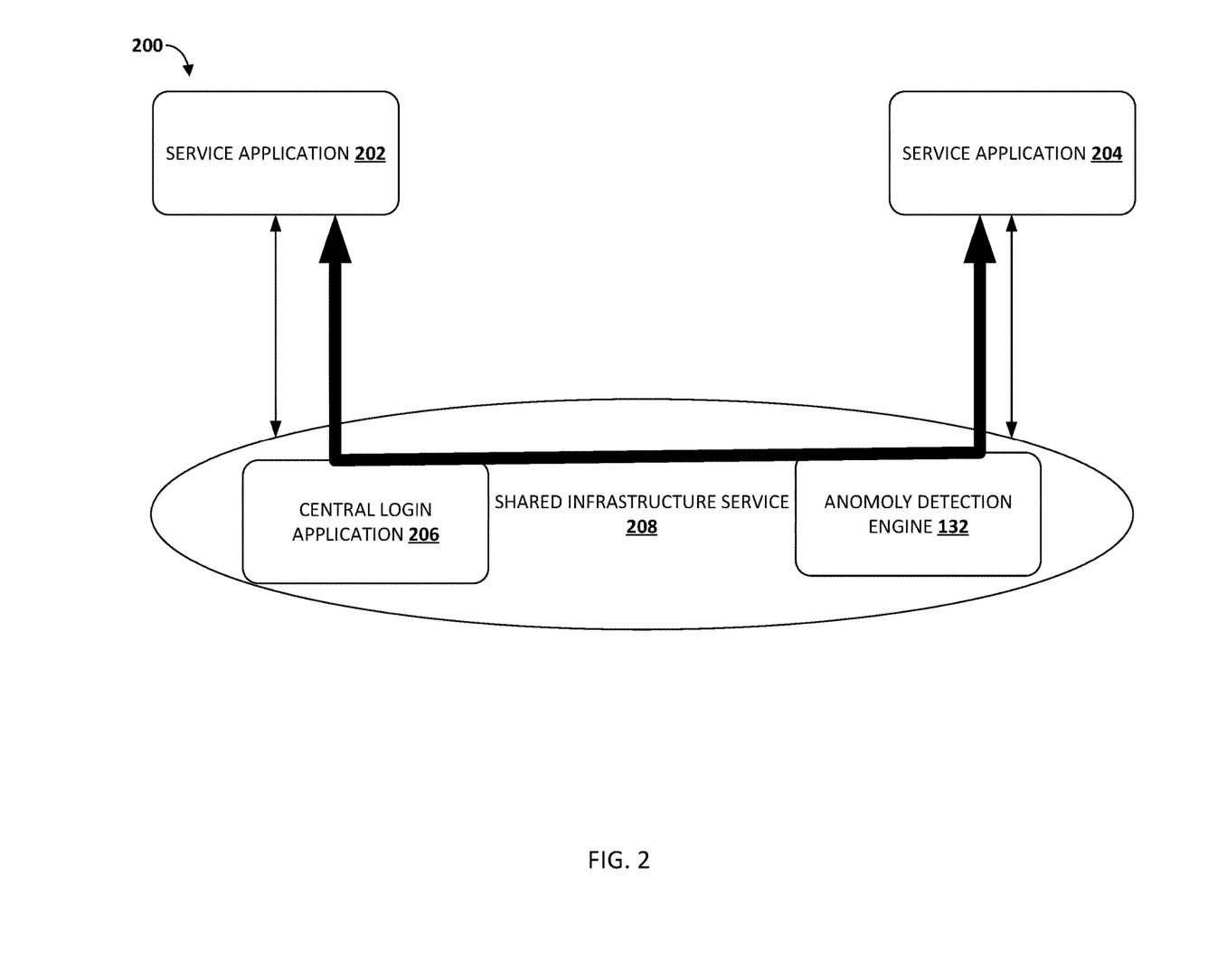
FIG. 2 is a block diagram illustrating the networked system in a shared infrastructure network architecture according to an embodiment of the present disclosure.

FIG. 2 is a block diagram showing a specific example of the networked system 100 as a shared infrastructure system 200 that may include a service application 202 that may be the application 112 of FIG. 1 and a service application 204 that may be the application 122 of FIG. 1 that operate on one or more computing nodes and that are logged in to a central login application 206 included on a shared infrastructure service 208, according to an embodiment. The shared infrastructure service 208 may include a message-oriented middleware (e.g., Atlas Message Queue (AMQ), Web-Sphere™, IBM MQ™, YAM MQ™, VariablesDataServ™) and/or any other middleware that would be apparent to one of skill in the art in possession of the present disclosure. For example, when completing a transaction by a transaction processing entity, a plurality of services may need to communicate with each other to complete the transaction. An authentication service, a payment transaction service, a risk analysis service, and/or any other service that may be used to process a transaction may be required to communicate information with each other and perform their respective functionality to complete the transaction. Thus, in various embodiments shared infrastructure service 208 may include a communication service that passes messages and/or other data between different applications such as service applications 202 and 204. As will be appreciated, additional service applications are present in various embodiments.

The service application 202, the service application 204, and/or any other number of service applications (not illustrated) may generate data objects such as, for example, log files, text files, messages and/or any other data object that includes text content as a result of their processes and communications. For example, a log file may be generated for a message passed between the service applications 202 and 204 that may be stored in the database 136. A message passed between service applications 202 and 204 may itself also be stored in database 136. These log files, messages, or other data objects that include text content may be fed to the anomaly detection engine 132 and the trained anomaly classifier 134, which may be included in the shared infrastructure service 208.

Before discussing the method 300 of FIG. 3, a data object 402 will be described relative to FIG. 4A. The data object 402 may be a log file, a text file, a message, and/or any other data object that includes text content that would be apparent to one of skill in the art in possession of the present disclosure. This data object may correspond to any number of different applications services (including application services that may utilize a central communication service).

The text content of the data object 402 may be unstructured, semi-structured, or structured. A structured data object may include data that follows a data model to form relations between the data (e.g., a spreadsheet of rows and columns). Unstructured data may be data that lacks any structure such as a text file or the content of an email message where the data does not have an associated data model. A semi-structured data object may include some data that with consistent characteristics and some unstructured data such that the data object does not conform to a structure as rigid as a relational database. The structure of the text content may be unknown to the anomaly detection engine 132 when the anomaly detection engine 132 receives the data object 402. However, in some embodiments, at least a portion of the structure of the text content may be known to the anomaly detection engine 132. In the illustrated example of the data object 402 in FIG. 4A, the data object 402 may include a message or a log file that is semi-structured in that the data object 402 includes text content of the Application Programming Interface (API) call parameters 402a and context parameters 402b. The context parameters 402b may include a plurality of fields (e.g., fields 404a, 404b, 404c) having a particular value (e.g., value 406a, 406b, 406c) for the field. For example, the field 404a may be a counterparty alias where the value 406a is a phone number of the counterparty, the field 404b may be a subject field where the value 406b is a Uniform Resource Locator (URL), the field 404c may be a sender account where the value 406c is a string of characters that identifies the sender account. While a few examples of fields and corresponding values are discussed, the data object 402 in FIG. 4A illustrates other fields and values and one or skill in the art in possession of the present disclosure will recognize that the data object 402 may include any sections, fields, and/or text content without departing from the scope of the present disclosure.

Figure 3:
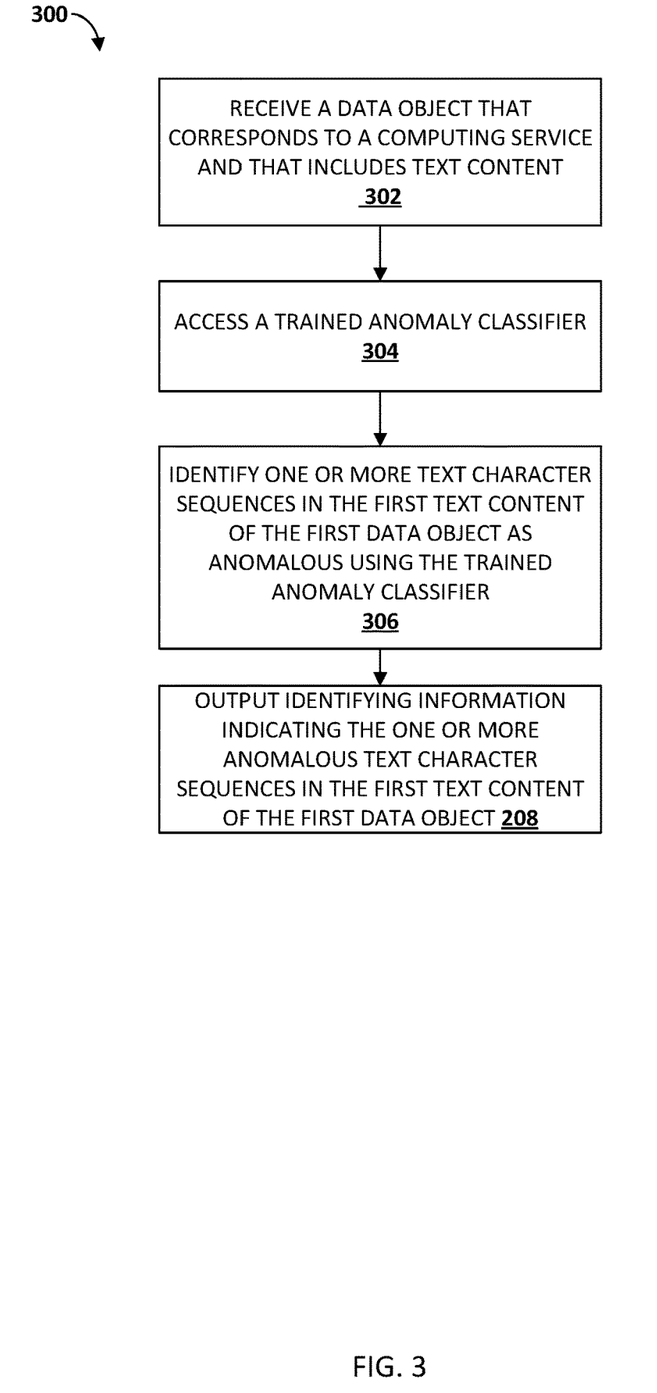
FIG. 3 is a flowchart illustrating a method of detecting anomalous text character sequences in text content included in a data object according to an embodiment of the present disclosure.
Figure 4A:
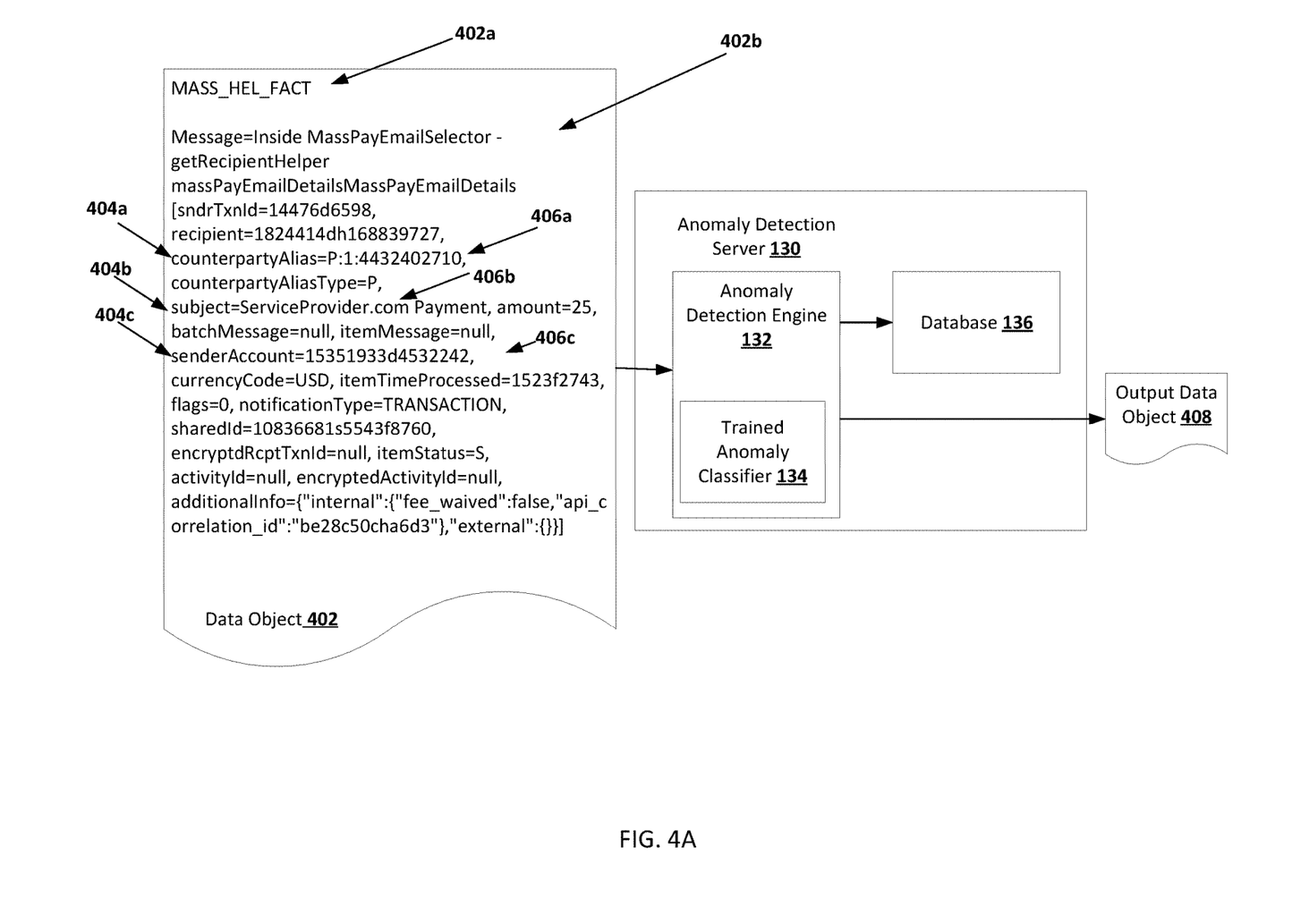
FIG. 4A is a block diagram illustrating an anomaly detection engine inputting a data object according to and embodiment of the present disclosure.

FIG. 3 illustrates a method 300 for detecting anomalous text character sequences in text content of one or more data objects according to an embodiment. In various embodiments, the anomaly detection server 130 may execute some or all elements of the method 300. However, it is contemplated that computing device 110 and/or the computing device 120 may execute some or all elements of the method 300 according to various embodiments. The method 300 begins at block 302 where a data object that corresponds with a computing service and that includes text content is received, according to some embodiments. In an embodiment, at block 302, the anomaly detection engine 132 may receive the data object 402 that corresponds with the application 112/202 and/or the application 122/204.

In various embodiments, the data object 402 may be a data object that is stored in the database 136 and retrieved by the anomaly detection engine 132 when requested by an administrator. In various embodiments, the data object 402 may be received in real-time as networked system 100 may be configured to process all data objects with the anomaly detection engine 132 as a data object is created. In other examples, if the networked system 100 via the anomaly detection engine 132 or other separate monitoring module monitors for various conditions within the network system 100 and if one of those conditions is satisfied, then the data object 402 that is associated with the condition or that was created when the condition occurred may be provided to the anomaly detection engine 132. As such, the data object 402 may be associated with a category of a plurality of categories. For example, the data object 402 may be labeled as being associated with a first condition, associated with a second condition, or associated with an nth condition. More specifically, in some embodiments, data object 402 may be labeled as corresponding to an error condition, or a no-error condition. The error (or no error) condition may be reported to shared infrastructure service 208 by an application such as service application 202, in the event that the application was unable to successfully process a message sent to the application by the shared infrastructure service. Thus, shared infrastructure service 208 may be aware that an error has occurred relative to a particular data object, but may not know the underlying cause of the error.

In a specific example, the application 112/202 may send a message to the application 122/204. The data object 402 may be a log file based on the message communicated to the application 122/204 and/or the message itself. The application 122/204 may respond to the message with an error message. The error message may satisfy an error condition monitored by the anomaly detection engine 132 that the data object 402 should be processed to identify anomalies in its text content. In another example, an application 112/202 may be experiencing a condition that initiates the anomaly detection engine 132. For example, the application 122/204 may be experiencing a latency that satisfies a predetermined latency condition. Log files associated with messages that are causing the latency at the application 122/204 may be associated with a category of satisfying a latency condition while those log files that are not associated with a latency condition are associated with a category of not satisfying the latency condition. When a log file is associated with the category of satisfying the latency condition that log file may be provided to the anomaly detection engine 132. While several conditions in which a data object may be received by the anomaly detection engine 132 are discussed, one of skill in the art in possession of the present disclosure will recognize that other conditions based on technology concerns, capacity concerns, user interface variance/isolation, business justifications and/or other conditions will fall under the scope of the present disclosure as well.

The method 300 then proceeds to block 304 where a trained anomaly classifier is accessed, according to some embodiments. In an embodiment, at block 304, the anomaly detection engine 132 may access the trained anomaly classifier 134. The trained anomaly classifier 134 may have been trained based on an artificial neural network by using a natural language processing algorithm on respective text content of at least a portion of each of a plurality of data objects corresponding to the application 112/202 and/or the application 122/204. Each of those plurality of data objects used to train the trained anomaly classifier may have been labeled as belonging to one of a plurality of categories when provided as an input to the artificial neural network. In various embodiments, the trained anomaly classifier 134 may be one of a plurality of trained anomaly classifiers that is selected based on the condition that causes the data object 402 to be provided to the anomaly detection engine 132. For example, the trained anomaly classifier 134 may be a latency trained anomaly classifier where the artificial neural network for trained anomaly classifier 134 is trained based on the data objects being labeled as satisfying the latency condition or not satisfying a latency condition (e.g., above a latency threshold or at or below a latency threshold). In another example, the trained anomaly classifier 134 may be an error trained anomaly classifier where the artificial neural network for the trained anomaly classifier 134 is trained based on the data objects used for training the anomaly classifier being labeled associated with unacceptable (e.g., error) conditions or being associated with acceptable (e.g., no error) conditions. Thus, when an error condition is detected, the error trained anomaly classifier may be accessed over the latency trained anomaly classifier. A method for training an anomaly classifier is discussed in more detail below with respect to the method 500 of FIG. 5.

The method 300 then proceeds to block 306 where one or more text character sequences in the first text content of the first data object are identified as anomalous using the trained anomaly classifier, according to some embodiments. In an embodiment, at block 306, the anomaly detection engine 132 may provide the received data object 402 to the trained anomaly classifier 134. The trained anomaly classifier 134 may process the data object 402 by using the natural language processing algorithm and by embedding the characters, the words, and/or the phrases of the data object 402 identified by the natural language processing algorithm as vectors. The vectors may be provided to the artificial neural network that is used by the trained anomaly classifier 134 to extract features of the data object and compare the features of the text content to determine any anomalies.

In various embodiments, the anomaly detection engine 132 may determine whether there are anomalies in the data object 402 by modifying one or more of the text character sequences identified by the natural language processing algorithm and providing the modified data object as an input to the trained anomaly classifier 134. The anomaly detection engine 132 may modify the selected text character sequence one or more times with a different text character sequence each time. The output from the trained anomaly classifier 134 may indicate whether the modification changed the result of the classification (e.g., a first condition being satisfied to a second condition being satisfied) or degree of the classification (e.g., the first condition is still satisfied but not as severe) for which the trained anomaly classifier 134 is trained. For example, if the modification to the data object 402 does not affect the classification associated with the data object 402, does not otherwise improve the classification associated with the data object 402, or otherwise further diminishes the classification of the data object 402, then the anomaly detection engine 132 may determine that the text character sequence of the data object 402 is not an anomaly. After completing one or more predetermined number of modifications to the same text character sequence, the anomaly detection engine 132 may then modify another text character sequence in the data object 402 and provided the modified data object to the trained anomaly classifier 134. If the modification to the data object 402 improves the classification of data object 402 (e.g., lesser degree of satisfying the condition based on a threshold or now satisfies a second condition), then the anomaly detection engine 132 may determine that this text character sequence of the data object 402 is an anomaly. The anomaly detection engine 132 may process each text character sequence in the data object 402 in a similar manner or may only process the text character sequences in the data object 402 until anomaly is discovered.

In various examples, the anomaly detection engine 132 may learn the fields of the data object 402 and the various possible values for those fields during the training of the trained anomaly classifier 134, discussed below. The anomaly detection engine 132 may vary the values of each field and determine, using the trained anomaly classifier 134, whether the modification to the data object 402 would change the condition associated with the data object 402. In the example where the trained anomaly classifier 134 is a latency trained anomaly classifier, a value of an "amount" field may be changed by the trained anomaly classifier from "$25" to "$40", from "$25" to "$100", from "$25" to "$1000", and/or any other value or representative number. The anomaly detection engine 132 may process these values and determine that changing the value has no impact on the latency condition being satisfied. However, when a value for a "country field" is changed by the anomaly detection engine 132 from "Brazil" to "Italy", from "Brazil" to "Canada" and/or any other value or representative number of values, the output of the trained anomaly classifier 134 may indicate that by changing "Brazil" to another country improves the classification of the data object 402 by determining that the change would not result in the latency condition being satisfied or result in an alternative latency condition being satisfied. The anomaly detection engine 132 would then determine that "Brazil" is the anomaly in the data object 402, according to this example.

The method 300 then proceeds to block 308 where identifying information indicating the one or more anomalous text character sequences in the first text content of the first data object is outputted, according to some embodiments. In an embodiment, at block 308, the anomaly detection engine 132 outputs identifying information that indicates one or more anomalous text character sequences in the text content of the data object 402. The anomalous text character sequences may include one or more characters in the text content. Referring to the example in FIG. 4A and FIG. 4B, the anomaly detection engine 132 may generate an output data object 408 that includes the data object 402 or a portion of the text content of the input data object 402. The output data object 408 may include a visual augmentation of the anomalous text character sequence 410 to appear different than the other text content in the output data object 408. For example, the output data object 408 may include a visual augmentation such as highlighting of an anomalous text character sequence 410. However, in other embodiments, the visual augmentation may include darkening the anomalous text character sequence 410, underlining the anomalous text character sequence 410, enlarging the anomalous text character sequence 410, and/or any other emphasis or visual augmentation that would be apparent to one of skill in the art in possession of the present disclosure. In some embodiments, besides the output data object 408, other data objects that are not anomalous may be outputted as well. Those non-anomalous data objects may include a visual augmentation of a non-anomalous text character sequence that corresponds with the text content of the output data object 404 that is provided as the anomalous text character sequence. In other words, the non-anomalous text character sequence that identifies the text content as non-anomalous and that corresponds with the text content of the anomalous text character sequences may be visually augmented while the other text content in the non-anomalous data object is not visually augmented. The type of visual augmentation of the non-anomalous text character sequence may be different than the type of visual augmentation used for the anomalous text character sequence.

Figure 4B:
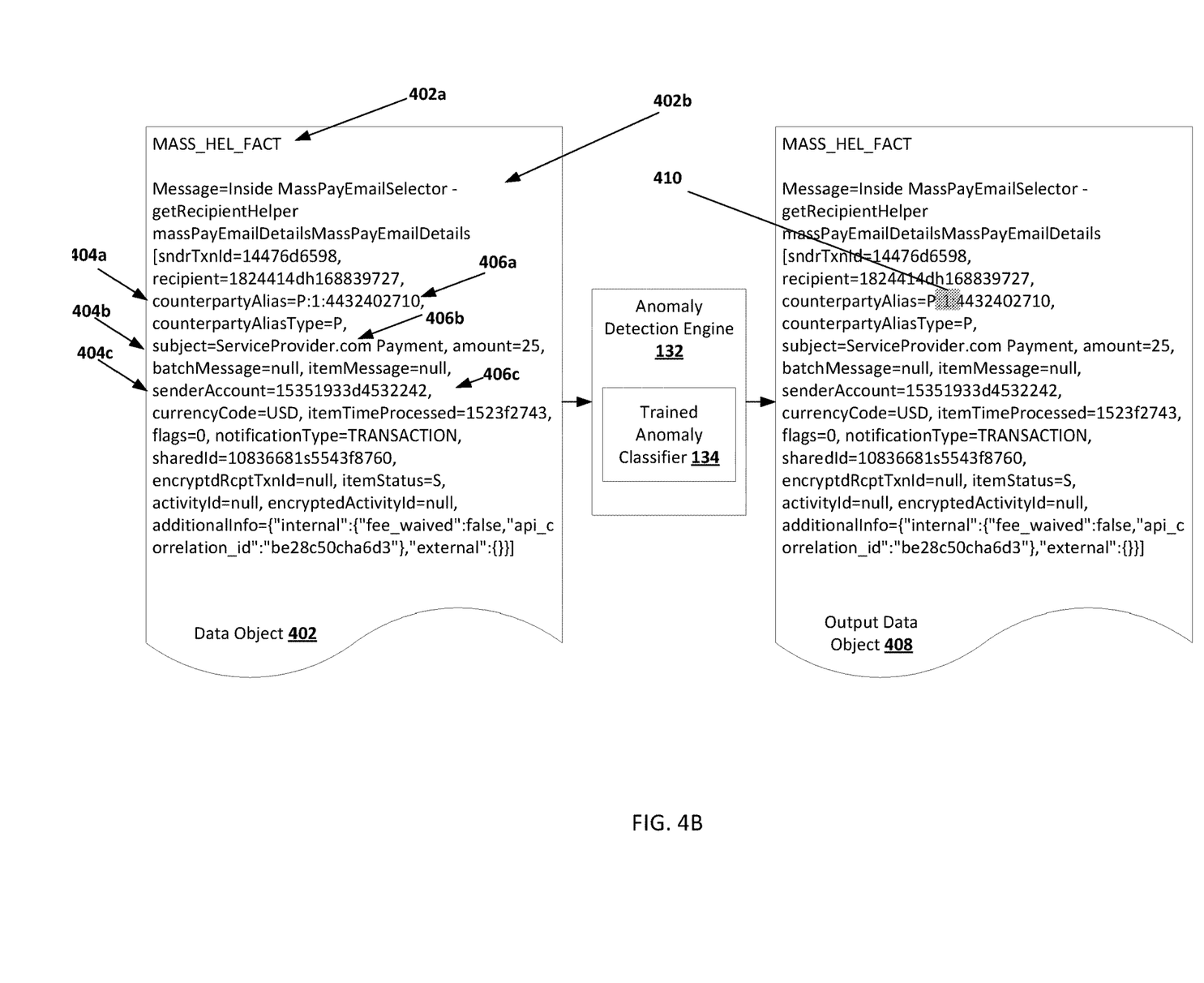
FIG. 4B is a block diagram illustrating an anomaly detection engine outputting an anomaly identified data object according to an embodiment of the present disclosure.

In some embodiments, the output data object 408 may be provided for display on a display device coupled to the anomaly detection server 130 locally or via the network 150. An administrator may then observer the identified anomalous text character sequence and determine visually whether the trained anomaly classifier 134 correctly identified the anomalous text character sequence 406. The user may provide a feedback indication to the anomaly detection engine 132 as to whether the anomalous text character sequence 410 and/or any identified non-anomalous text character sequences were correctly identified. The feedback indication may be used to reinforce the trained anomaly classifier 134. The user may also identify what is causing the anomaly from the output data object 408 and the visually augmented anomalous text character sequence 410. For example, the anomalous text character sequence 410 may include ":1:", which may indicate that the value 406a for the counterparty alias field 404a is in the incorrect format or should be something other than a phone number (e.g., such as an email address). In other examples, a time of the transaction and/or a specific country from which the message originates may be visually augmented for when trying to determine why the networked system 100 is experiencing unacceptable latency. The user may then perform remedial actions based on the determinations to correct the unacceptable performance or improve on the performance of the networked system 100. For example, more computing resources may be allocated to the applications 112/202 and/or 122/204 during the time of day that the latency occurs.

In various embodiments of method 300, more than one data object may be accessed by the anomaly detection engine 132. The trained anomaly classifier 134 may identify one or more first common anomalous text character sequences in first text content of a first set of the second plurality of data objects and identify one or more second common anomalous text character sequences in second text content of a second set of the second plurality of data objects. The trained anomaly classifier 134 may generate an output that includes identifying information indicating the one or more first common anomalous text character sequences in the first set of the second plurality of data objects and identifying information indicating the one or more second common anomalous text character sequences in the second set of the second plurality of data objects. However, in other examples, the trained anomaly classifier 134 may determine that the one or more first common anomalous text character sequences satisfies a predetermined condition and generates an output that includes identifying information indicating the one or more first common anomalous text character sequences in the first set of the second plurality of data object. The trained anomaly classifier 134 may determine that the one or more second common anomalous text character sequences does not satisfy the predetermined condition and omits from the output any identifying information indicating the one or more second common anomalous text character sequences in the second set of the second plurality of data objects. For example, a more frequent anomaly may be outputted over a less frequent anomaly. In other examples, the user may want to omit a known anomaly that may not be the cause of the issue to determine other anomalies in the data objects.

Figure 5:
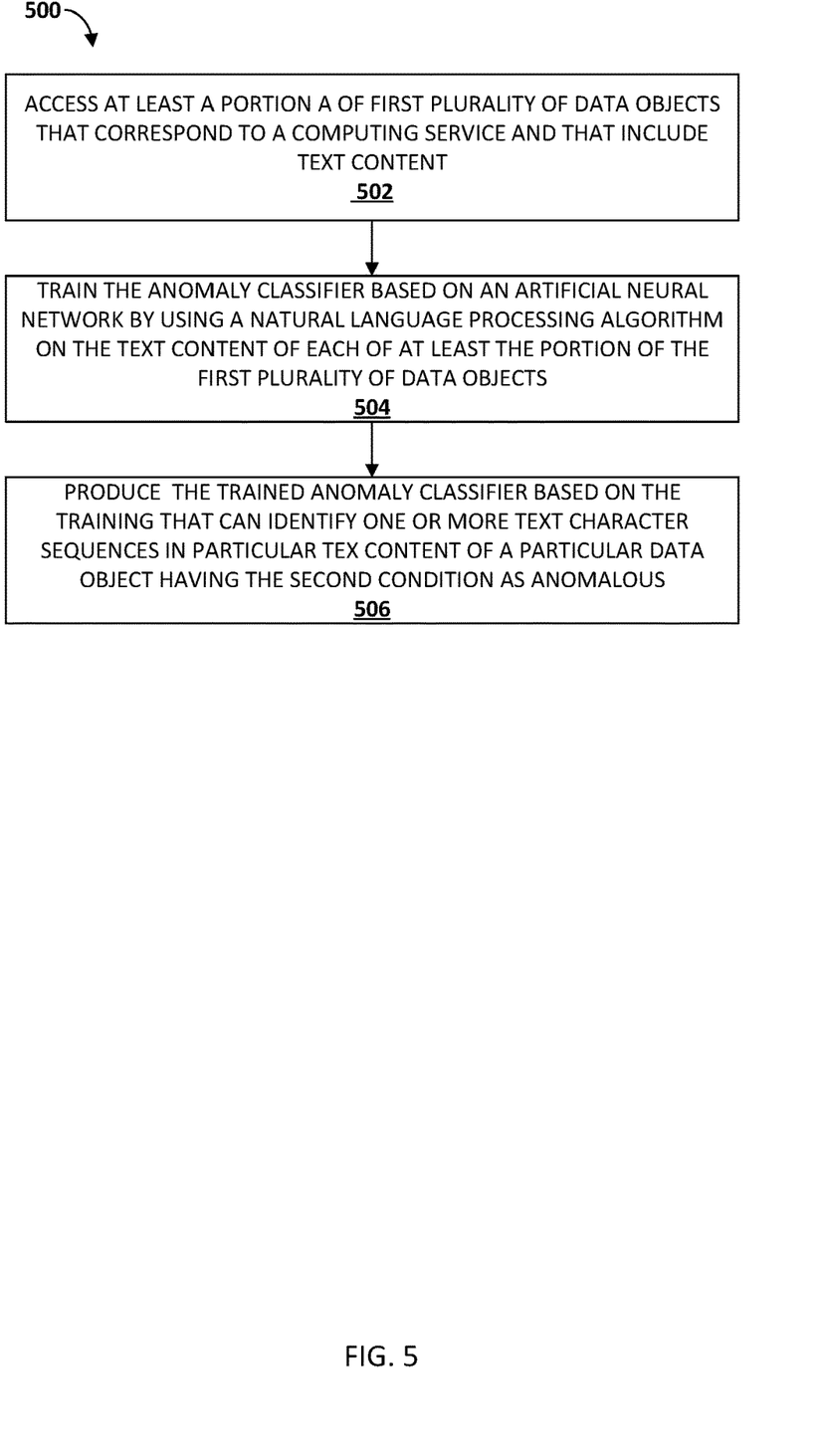
FIG. 5 is a flowchart illustrating a method of training an anomaly classifier used during the method of FIG. 3 according to an embodiment of the present disclosure.

Referring now to FIG. 5, a method 500 for training an anomaly classifier is illustrated according various embodiments of the present disclosure and with respect to block 304 of method 300. In various embodiments, the anomaly detection server 130 may execute some or all elements of the method 500. However, it is contemplated that computing device 110 and/or the computing device 120 may execute some or all elements of the method 500. The method 500 may begin at block 502 where at least a portion of a first plurality of data objects (such as data object 402) that correspond to a computing service and that include text content are accessed. In an embodiment, at block 502, the anomaly detection engine 132 may include the anomaly classifier generator 138. The anomaly classifier generator 138 may obtain data objects that are stored in the database 136 or another storage device that is coupled to the network 150. The data objects that are accessed may be labeled according to a condition that is satisfied or not satisfied. However, in other embodiments, the data objects may be labeled as one of a plurality of categories. For example, the data objects used for training the anomaly classifier may be labeled as satisfying a latency condition or not satisfying a latency condition (e.g., above a latency threshold or at or below a latency threshold). In another example, the data objects used for training the anomaly classifier may be labeled as being associated with unacceptable (e.g., error) conditions or being associated with acceptable (e.g., no error) conditions. While specific embodiments of negative examples and positive examples in a binary classification problem are described, one of skill in the art in possession of the present disclosure will recognize that the data objects may be labeled according to various binary classifications that are associated with a condition on the networked system 100 as well as more than two classifications. In various embodiments, for some conditions in the networked system 100 for generating a particular trained anomaly classifier a data object may be labeled as a negative example, while for other conditions in the networked system 100 for generating a particular trained anomaly classifier the same data object may be labeled as a positive example.

Furthermore, a complete structural format of the text content of each data objects may not be available to the anomaly detection engine 132. For example, the structure of the data objects may be completely unknown to the anomaly detection engine 132 or may be partially known to the anomaly detection engine 132—specifically at least some text present in a log file or message may have a format that is not known to anomaly detection engine 132. As such, the anomaly classifier generator 138 may not know the "rules" of the data object and application service from which the data object is generated prior to the accessing of the plurality of data objects.

The method 500 may then proceed to block 504 where the anomaly classifier is trained based on an artificial neural network, or other type of classifier, by using a natural language processing algorithm on the text content of each of at least the portion of the first plurality of data objects. In an embodiment, at block 504, the anomaly classifier generator 138 may train an anomaly classifier for a given condition using an artificial neural network and by using a natural language processing algorithm on the text content of each of the at least the portion of the first plurality of data objects. As discussed above, each of the first plurality of data objects is labeled as having a first condition or as having a second condition (e.g., a negative example and a positive example of a rule), and a complete structural format of the text content of the data objects is not available to the anomaly classifier generator 138 during the training.

The anomaly classifier generator 138 may include a natural language processing algorithm that identifies characters, words, and/or phrases in the data objects. The anomaly classifier generator 138 may then perform embedding on those data objects such that the characters, the words, and/or the phrases are mapped to vectors in low-dimensional space relative to the vocabulary size or another convenient representation space that would be apparent to one of skill in the art in possession of the present disclosure. The anomaly classifier generator 138 may then use a neural network application, such as TensorFlow provided by Google™ of Mountain View, Calif., USA, to train an artificial neural network using the vectors of the text content.

In one example related to training the anomaly classifier, the anomaly classifier generator 138 may use an unsupervised neural network to extract features from the vectors of the text content and use those features and the labels of each of the first plurality of data objects to train a supervised neural network that can determine one or more text character sequences in the text content in the first plurality of data objects as anomalous. The unsupervised neural network may be trained for a plurality of epochs and the outputs of the unsupervised neural network may be used as the initial weights for the supervised neural network. Thus, the unsupervised neural network may be used as a feature extractor to learn the structure and possible values of the data objects and the supervised neural network that is stacked on at least one copy of the unsupervised neural network may compare the features of the text content to determine/predict any anomalies. The supervised neural network may then be trained by selecting at random a vector from a data object that is a negative example and a vector from a data object that is a positive example and providing the pair as an input to the artificial neural network that includes the stacked unsupervised and supervised neural network. A plurality of these input pairs may be provided for each epoch and a plurality of epochs may be performed on the artificial neural network. In other examples, the data objects themselves may be inputted in to the artificial neural network that includes the stacked unsupervised neural network and the supervised neural network. In various embodiments, the training may be adjusted until a satisfactory training and validation accuracy is obtained (e.g., 75% accurate, 80% accurate, 90% accurate, 95% accurate, 98% accurate, or any other accuracy that would be acceptable to user of the system). In experimental results, accuracy that is greater than 95% has been achieved and this is without any knowledge or without complete knowledge of the structure of the data objects before they are analyzed. However, other success criteria besides accuracy may be used. For example, for a highly unbalanced dataset, F1 score, Receiver Operating Characteristic (ROC) Area Under the ROC curve (AUC), precision, and/or recall may provide better success criteria relative to accuracy. An example machine learning algorithm implemented as an artificial neural network is discussed below in reference to FIG. 6.

The method 500 may then proceed to block 506 where a trained anomaly classifier is produced based on the training that can identify one or more text character sequences in particular text content of a particular data object having the second condition as anomalous. In an embodiment, at block 506, the anomaly classifier generator 138 produces the trained anomaly classifier 134. The trained anomaly classifier 134 may be associated with a condition for which it was created and by which it was trained (e.g., error condition, network performance condition (e.g., a latency condition), application performance condition, customer satisfaction condition, business condition, etc.). The trained anomaly classifier 134 may be stored in the database 136 for future use by the anomaly detection engine 132.

Figure 6:
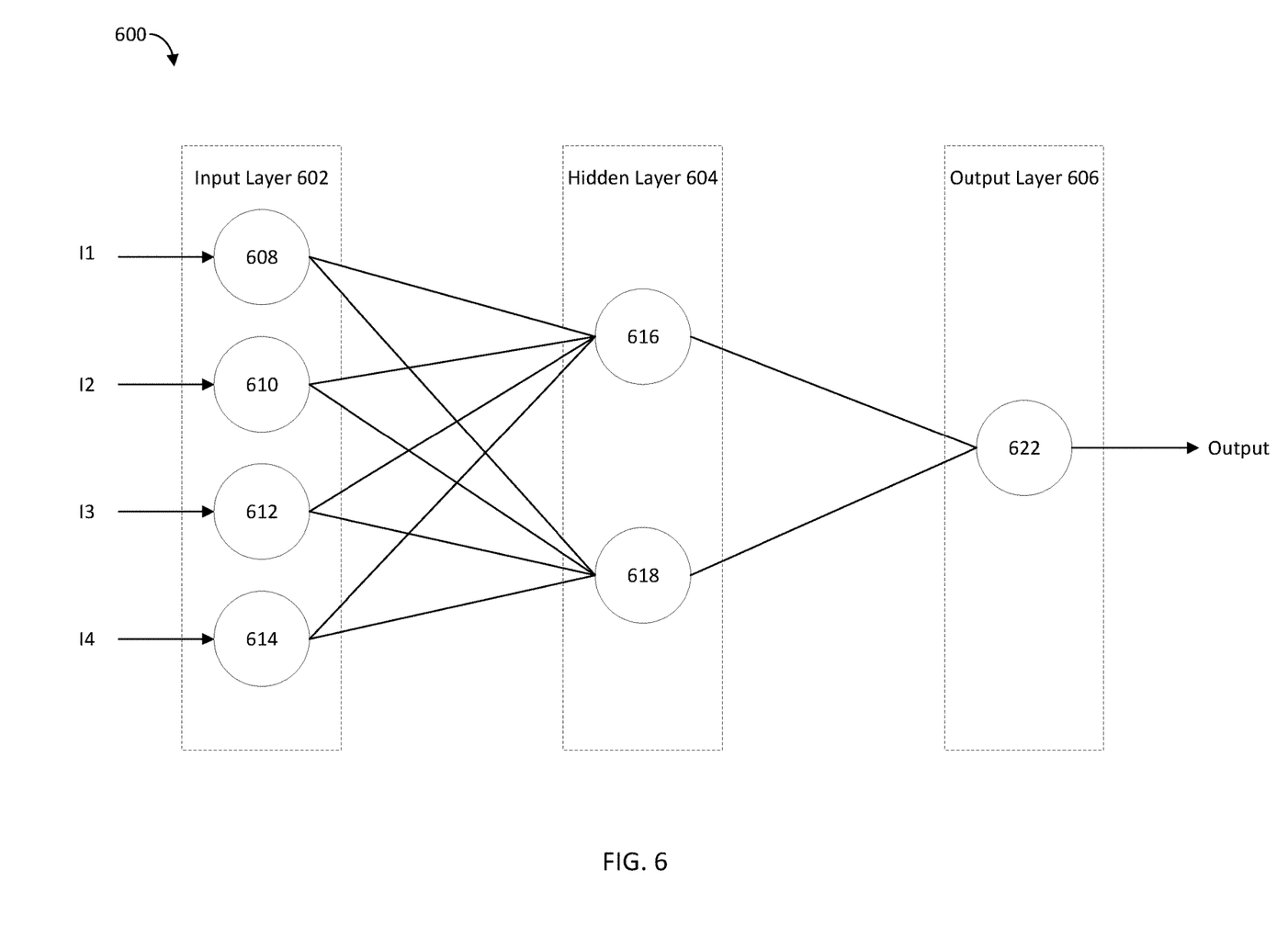
FIG. 6 illustrates an artificial neural network according to an embodiment of the present disclosure.

FIG. 6 illustrates an example machine learning algorithm implemented as an artificial neural network 600. As shown, the artificial neural network 600 includes three layers—an input layer 602, a hidden layer 604, and an output layer 606. Each of the layers 602, 604, and 606 may include one or more nodes. For example, the input layer 602 includes nodes 608-614, the hidden layer 604 includes nodes 616-618, and the output layer 606 includes a node 622. In this example, each node in a layer is connected to every node in an adjacent layer. For example, the node 608 in the input layer 602 is connected to both of the nodes 616-618 in the hidden layer 604. Similarly, the node 616 in the hidden layer is connected to all of the nodes 608-614 in the input layer 602 and the node 622 in the output layer 606. Although only one hidden layer is shown for the artificial neural network 600, it has been contemplated that the artificial neural network 600 used by the data analysis module 140 may include as many hidden layers as necessary. As discussed above, the unsupervised neural network may be provided as the input layer 602 and multiple hidden layers while the supervised neural network may be provided as multiple hidden layers and the output layer 606.

In this example, the artificial neural network 600 receives a set of input values and produces an output value. Each node in the input layer 602 may correspond to a distinct input value (e.g., a model parameter). For example, the node 608 may correspond to a first parameter of a model, the node 610 may correspond to a second parameter of the model, the node 612 may correspond to a third parameter of the model, and the node 614 may correspond to the deviation computed for the model.

In some embodiments, each of the nodes 616-618 in the hidden layer 604 generates a representation, which may include a mathematical computation (or algorithm) that produces a value based on the input values received from the nodes 608-614. The mathematical computation may include assigning different weights to each of the data values received from the nodes 608-614. The nodes 616 and 618 may include different algorithms and/or different weights assigned to the data variables from the nodes 608-614 such that the nodes 616-618 may produce different values based on the same input values received from the nodes 608-614. The values generated by the nodes 616 and 618 may be used by the nodes 622 in the output layer 606 to produce an output value for the artificial neural network 600.

Thus, systems and methods have been described where a trained anomaly classifier is generated such that a complete structure or no structure of the data object needs to be known to the trained anomaly classifier before a data object is inputted into the trained anomaly classifier. When a data object is received by the anomaly detection system, an anomaly detection engine may access the trained anomaly classifier and use the trained anomaly classifier to output identifying information indicating one or more anomalous text character sequences in the text content of the data object. The identifying information may be used by an administrator to mitigate or enhance conditions in a networked system or application.

Figure 7:
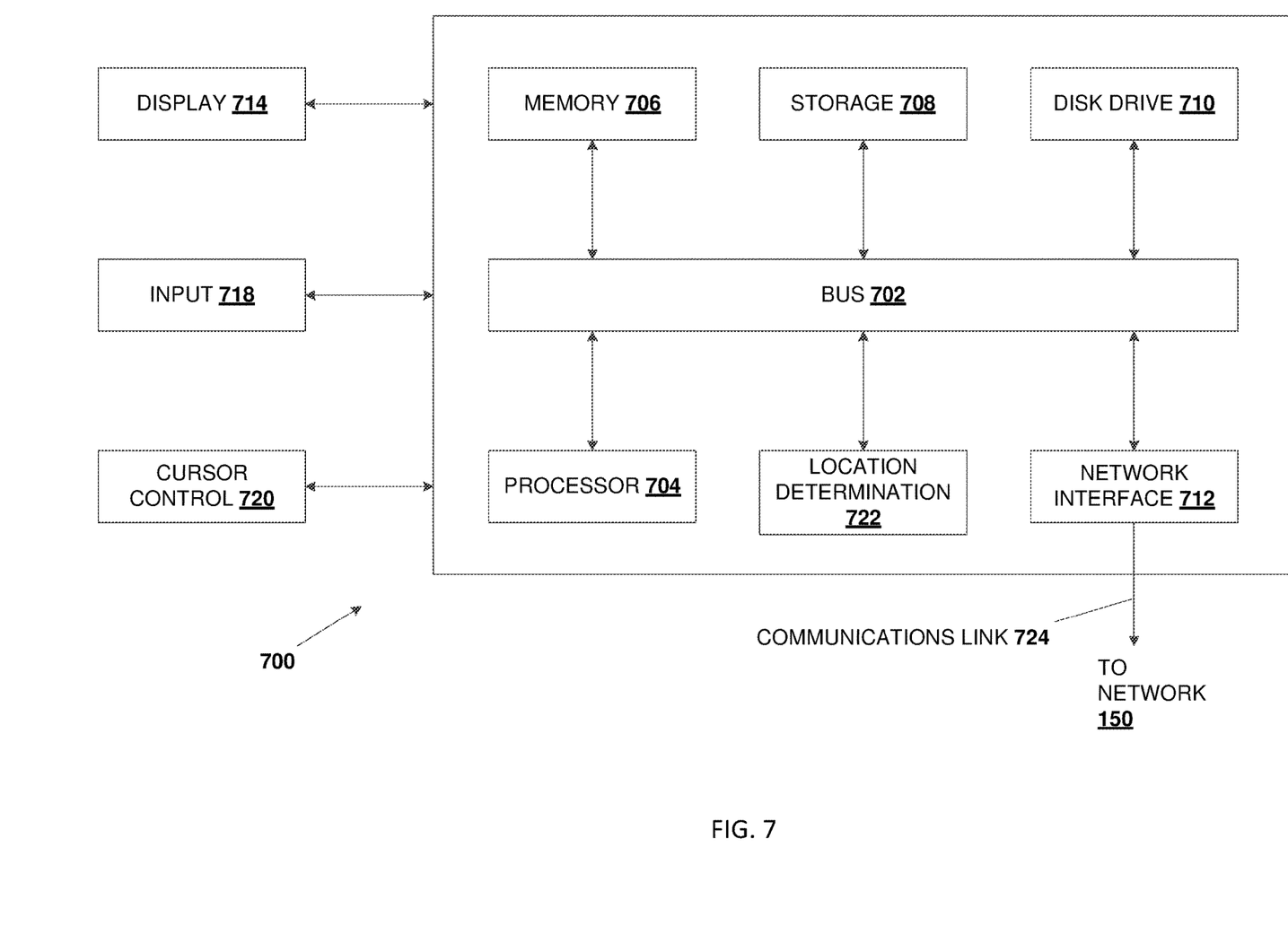
FIG. 7 is a block diagram of an example computer system according to various aspects of the present disclosure.

FIG. 7 is a block diagram of a computer system 700 suitable for implementing one or more embodiments of the present disclosure, including the anomaly detection server 130, the computing device 120, and the computing device 110. In various implementations, the computing device 110 may include a mobile cellular phone, personal computer (PC), laptop, wearable computing device, etc. adapted for wireless communication, and each of the computing device 120 and the anomaly detection server 130 may include a network computing device, such as a server. Thus, it should be appreciated that the devices 110, 120, and 130 may be implemented as the computer system 700 in a manner as follows.

In accordance with various embodiments of the present disclosure, computer system 700, such as a computer and/or a network server, includes a bus 702 or other communication mechanism for communicating information, which interconnects subsystems and components, such as a processor 704 (e.g., processor, micro-controller, digital signal processor (DSP), etc.), a system memory component 706 (e.g., RAM), a static storage component 708 (e.g., ROM), a disk drive component 710 (e.g., magnetic or optical), a network interface component 712 (e.g., modem or Ethernet card), a display component 714 (e.g., CRT or LCD), an input component 718 (e.g., keyboard, keypad, or virtual keyboard), a cursor control component 720 (e.g., mouse, pointer, or trackball), and/or a location determination component 722 (e.g., a Global Positioning System (GPS) device as illustrated, a cell tower triangulation device, and/or a variety of other location determination devices known in the art.) In one implementation, the disk drive component 710 may comprise a database having one or more disk drive components.

In accordance with embodiments of the present disclosure, the computer system 700 performs specific operations by the processor 704 executing one or more sequences of instructions contained in the memory component 706, such as described herein with respect to the computing devices and anomaly detection server, and/or any other device. Such instructions may be read into the system memory component 706 from another computer readable medium, such as the static storage component 708 or the disk drive component 710. In other embodiments, hard-wired circuitry may be used in place of or in combination with software instructions to implement the present disclosure.

Logic may be encoded in a computer readable medium, which may refer to any medium that participates in providing instructions to the processor 704 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 710, volatile media includes dynamic memory, such as the system memory component 706, and transmission media includes coaxial cables, copper wire, and fiber optics, including wires that comprise the bus 702. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 700. In various other embodiments of the present disclosure, a plurality of the computer systems 700 coupled by a communication link 724 to the network 150 (e.g., such as a LAN, WLAN, PTSN, and/or various other wired or wireless networks, including telecommunications, mobile, and cellular phone networks) may perform instruction sequences to practice the present disclosure in coordination with one another.

The computer system 700 may transmit and receive messages, data, information and instructions, including one or more programs (i.e., application code) through the communication link 724 and the network interface component 712. The network interface component 712 may include an antenna, either separate or integrated, to enable transmission and reception via the communication link 724. Received program code may be executed by processor 704 as received and/or stored in disk drive component 710 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a computing device, a server device, other devices described herein.

What is claimed is:

1. A system, comprising:
a non-transitory memory storing instructions; and
one or more hardware processors coupled to the non-transitory memory and configured to read the instructions from the non-transitory memory to cause the system to perform operations comprising:
accessing at least a portion of a first plurality of data objects corresponding to a computing service, wherein each of the first plurality of data objects includes text content;
training an anomaly classifier based on an artificial neural network by using a natural language processing algorithm on the text content of each of at least the portion of the first plurality of data objects, wherein each of the first plurality of data objects is labeled as having a first condition or as having a second condition, and wherein a complete structural format of the text content of the data objects is not available to the system during the training; and
based on the training, producing a trained anomaly classifier that can identify one or more text character sequences in particular text content of a particular data object having the second condition as anomalous.

2. The system of claim 1, wherein the operations further comprise:
receiving a first data object that corresponds to the computing service and that includes first text content;
identifying, using the trained anomaly classifier, one or more text character sequences in the first text content of the first data object as anomalous; and
outputting identifying information indicating the one or more anomalous text character sequences in the first text content of the first data object.

3. The system of claim 2, wherein the first data object is labeled as having the first condition, and wherein the first condition is a no error condition.

4. The system of claim 1, wherein the second condition is an error condition.

5. The system of claim 1, wherein the operations further comprise:
receiving a second plurality of data objects that each corresponds to the computing service and that each includes text content;
identifying, using the trained anomaly classifier, one or more first common anomalous text character sequences in first text content of a first set of the second plurality of data objects;
identifying, using the trained anomaly classifier, one or more second common anomalous text character sequences in second text content of a second set of the second plurality of data objects; and
outputting, in response to determining that the one or more first common anomalous text character sequences satisfies a predetermined condition, identifying information indicating the one or more first common anomalous text character sequences in the first set of the second plurality of data objects.

6. The system of claim 5, wherein the operations further comprise:
omitting, in response to determining that the one or more second common anomalous text character sequences does not satisfy a predetermined condition, identifying information indicating the one or more second common anomalous text character sequences in the second set of the second plurality of data objects.

7. The system of claim 1, wherein the training the trained anomaly classifier includes:
using an unsupervised neural network to extract features from the text content; and
training, using the extracted features and the labels of each of the first plurality of data objects, a supervised neural network to determine one or more text character sequences in the text content in the first plurality of data objects as anomalous.

8. A method, comprising
receiving a first data object that corresponds to a first computing service and that includes first text content;
accessing a trained anomaly classifier, wherein the trained anomaly classifier was trained based on an artificial neural network by using a natural language processing algorithm on respective text content of at least a portion of each of a plurality of data objects corresponding to the first computing service, and wherein each of the plurality of data objects is labeled as belonging to one of a plurality of categories;
identifying, using the trained anomaly classifier, one or more text character sequences in the first text content of the first data object as anomalous; and
outputting identifying information indicating the one or more anomalous text character sequences in the first text content of the first data object.

9. The method of claim 8, wherein the first data object is a log file that is generated based on communications between the first computing service and a second computing service.

10. The method of claim 8, further comprising:
determining that the first data object is included in a first category of the plurality of categories, wherein the accessing the trained anomaly classifier is in response to the determining that the first data object is included in the first category of the plurality of categories.

11. The method of claim 10, wherein the first category of the plurality of categories is an error condition.

12. The method of claim 8, further comprising:
sending the first data object to a second computing service; and
receiving an error message from the second computing service that the first data object resulted in an error, wherein the identifying is performed in response to receiving the error message.

13. The method of claim 8, wherein outputting identifying information indicating the one or more anomalous text character sequences includes causing the one or more anomalous text character sequences to be visually augmented on a user interface to appear different than other text content of the first text content.

14. The method of claim 8, further comprising:
updating the trained anomaly classifier by at least one of penalizing the artificial neural network for incorrectly identifying one or more anomalous text character sequences or rewarding the artificial neural network for correctly identifying one or more anomalous text character sequences.

15. A non-transitory machine-readable medium having stored thereon machine-readable instructions executable to cause a machine to perform operations comprising:
receiving a first data object that corresponds to a first computing service and that includes first text content;
accessing a trained anomaly classifier, wherein the trained anomaly classifier was trained based on an artificial neural network by using a natural language processing algorithm on respective text content of at least a portion of each of a plurality of data objects corresponding to the first computing service, and wherein each of the plurality of data objects is labeled an error condition or a no error condition;
identifying, using the trained anomaly classifier, one or more text character sequences in the first text content of the first data object as anomalous; and
outputting identifying information indicating the one or more anomalous text character sequences in the first text content of the first data object.

16. The non-transitory machine-readable medium of claim 15, wherein the first data object is a log file that is generated from communications between the first computing service and a second computing service.

17. The non-transitory machine-readable medium of claim 15, wherein the operations further comprise:
determining that the first data object is associated with an error condition, wherein the accessing the trained anomaly classifier is in response to the determining that the first data object is associated with the error condition.

18. The non-transitory machine-readable medium of claim 15, wherein the operations further comprise:
sending the first data object to a second computing service; and
receiving an error message from the second computing service that the first data object resulted in an error, wherein the identifying is performed in response to receiving the error message.

19. The non-transitory machine-readable medium of claim 15, wherein the operations further comprise:
receiving a second data object that corresponds to the first computing service and that includes second text content;
identifying, using the trained anomaly classifier, one or more text character sequences in the second text content of the second data object as non-anomalous; and
outputting identifying information indicating the one or more non-anomalous text character sequences in the second text content of the second data object that correspond with the one or more anomalous text character sequences in the first text content of the first data object.

20. The non-transitory machine-readable medium of claim 19, wherein the identifying information indicating the one or more non-anomalous text character sequences is visually augmented differently than the identifying information indicating the one or more anomalous text character sequences.

* * * * *